April 22, 1958 — D. MATTHEWS — 2,831,543
JET DRIVEN HELICOPTER ROTOR SYSTEM
Filed April 23, 1956 — 2 Sheets-Sheet 1
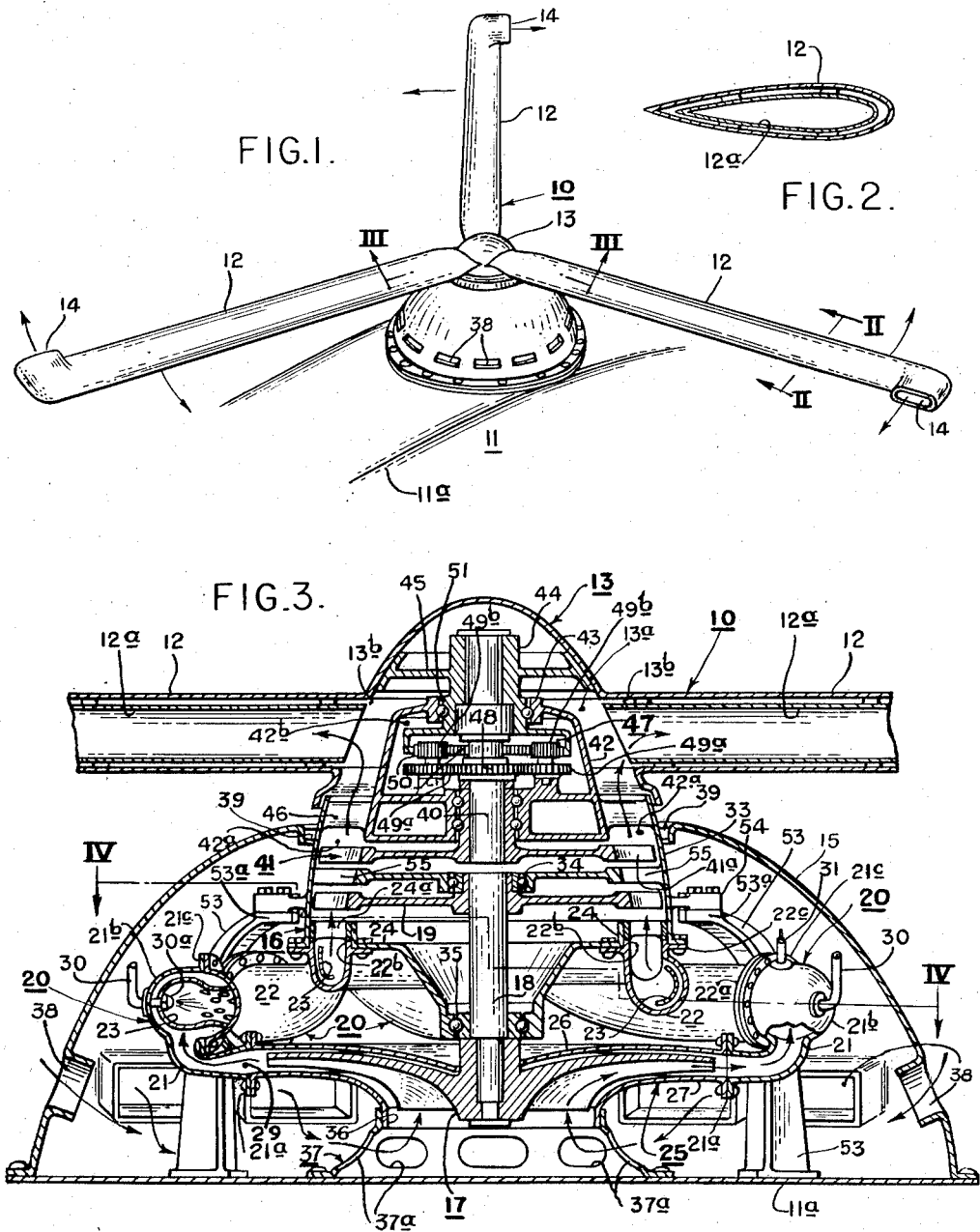
INVENTOR
DONALD MATTHEWS
BY
AGENT April 22, 1958 D. MATTHEWS 2,831,543
JET DRIVEN HELICOPTER ROTOR SYSTEM
Filed April 23, 1956 2 Sheets-Sheet 2

INVENTOR
DONALD MATTHEWS
BY
AGENT

United States Patent Office 2,831,543
Patented Apr. 22, 1958

2,831,543

JET DRIVEN HELICOPTER ROTOR SYSTEM

Donald Matthews, Kansas City, Mo., assignor to Westinghouse Electric Corporation, East Pittsburgh, Pa., a corporation of Pennsylvania Application April 23, 1956, Serial No. 580,045

6 Claims. (Cl. 170—135.4)

This invention relates to helicopters, more particularly to propulsion means therefor, and has for an object to provide an improved and highly efficient arrangement for driving a helicopter propelling rotor.

It is a further object of the invention to provide an improved free-wheeling arrangement for a helicopter propelling rotor.

It is another object of the invention to provide a free-wheeling turbine rotor for driving a helicopter propelling rotor in which the exhaust gases from the turbine rotor are further utilized to jet propel the helicopter rotor upon final ejection to the atmosphere.

A more specific object is to provide helicopter propulsion apparatus of the above type having a symmetrical form about the rotational axis of the helicopter rotor hub and in which a gas turbine power engine disposed on said axis is provided for producing the hot gases which propel the helicopter rotor.

In accordance with the invention, the helicopter propelling rotor is provided with a central hub supporting a plurality of blades having jet exhaust nozzles at their tips and longitudinal gas passages communicating with a central gas passageway in the rotor hub. A tubular shell disposed beneath the hub and coaxial therewith encases a suitably supported free-wheeling gas turbine rotor for mechanically driving the helicopter rotor. The turbine rotor is mechanically coupled, by means of suitable speed reduction gearing, to the rotor hub, so that as hot motive gases are supplied, the turbine rotor rotates at high speed and, in turn, drives the helicopter rotor at a suitable lower speed. The thus partially expanded gases are then directed through the longitudinal passages in the helicopter rotor blades and exhausted at the exhaust nozzles in a jet to impart an augmenting propulsive thrust to the helicopter rotor. The hot gases for driving the free-wheeling turbine rotor are provided by a gas turbine engine mounted on the same vertical axis as the helicopter rotor hub and free-wheeling turbine rotor, but at a lower level, so that a compact and symmetrical arrangement is provided. Air for combustion is drawn from the atmosphere through an apertured cowl encompassing the gas turbine engine.

The above and other objects are effected by the invention as will be apparent from the following description and claims taken in connection with the accompanying drawings, forming a part of this application, in which:

Fig. 1 is a perspective view of a helicopter rotor having the improved propulsion apparatus incorporated therein;

Fig. 2 is a cross-sectional view of one of the rotor blades, taken on line II—II of Fig. 1;

Fig. 3 is an axial sectional view taken on line III—III of Fig. 1, looking in the direction of the arrows;

Figure 4:
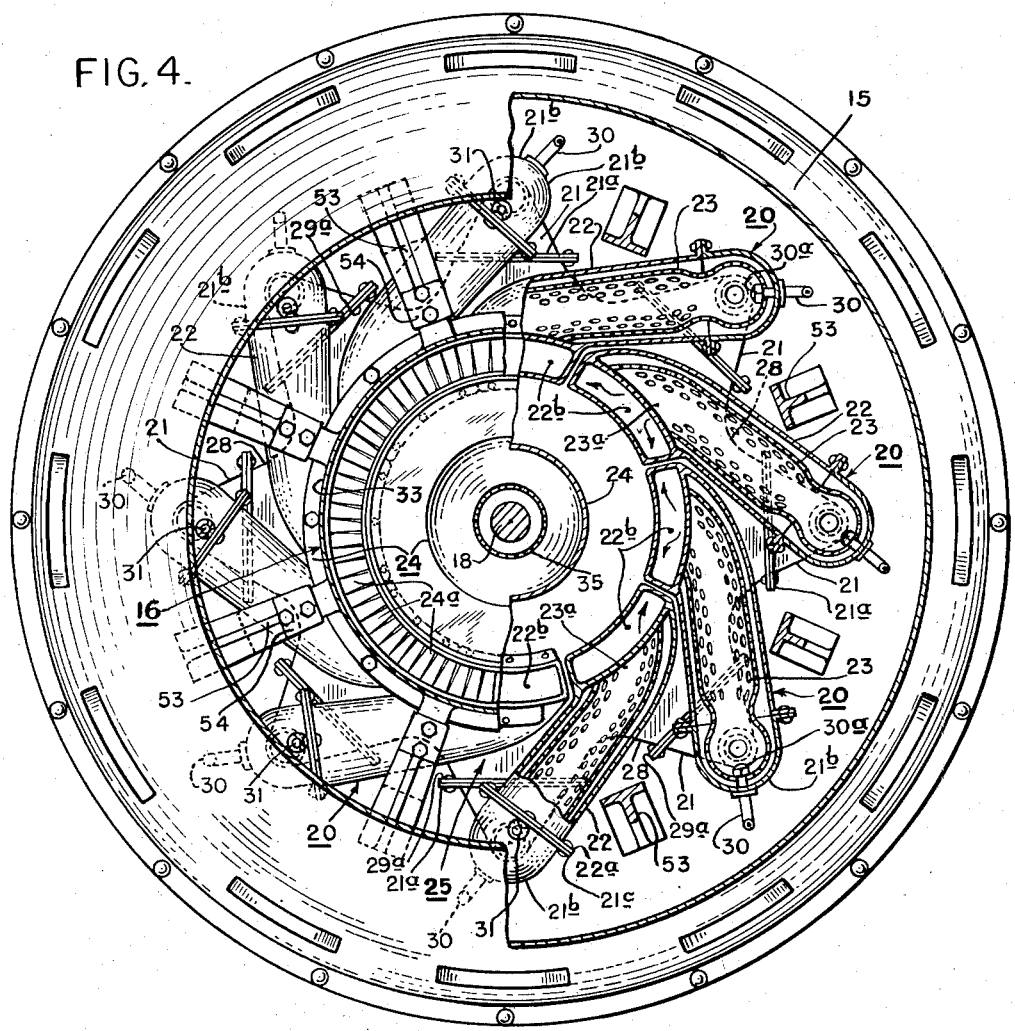
Fig. 4 is a cross-sectional view taken on line IV—IV of Fig. 3 and looking in the direction of the arrows.

Referring to the drawings in detail, especially Fig. 1, there is shown a rotor 10 for propelling a helicopter 11 (the fuselage 11a of which is indicated in fragmentary form). The helicopter propelling rotor 10 is provided with a plurality of blades 12, preferably of airfoil cross-section, as shown in Fig. 2, attached to a central hub portion 13 for joint rotation therewith about a vertical axis. The blades 12 are of hollow form and are provided with longitudinal ducts 12a extending from the hub portion 13 to exhaust nozzles 14 mounted at the outer tips of the blades.

Referring to Fig. 3, the hub portion 13 is also of hollow form and defines a chamber 13a having outlets 13b registering with the inner ends of the blade ducts 12a, for a purpose subsequently to be described. In concentric relation with the hub 13, there is provided a semi-spherical cowl 15 supported upon the fuselage 11a and acting as a closure for a gas turbine engine, generally designated 16, having a centrifugal air compressor impeller 17 mounted upon a vertically disposed driving shaft 18 connected at its upper end to a bladed turbine rotor 19 and driven thereby. A plurality of combustion chambers 20 are disposed intermediate the impeller 17 and the turbine rotor 19.

Figure 5:
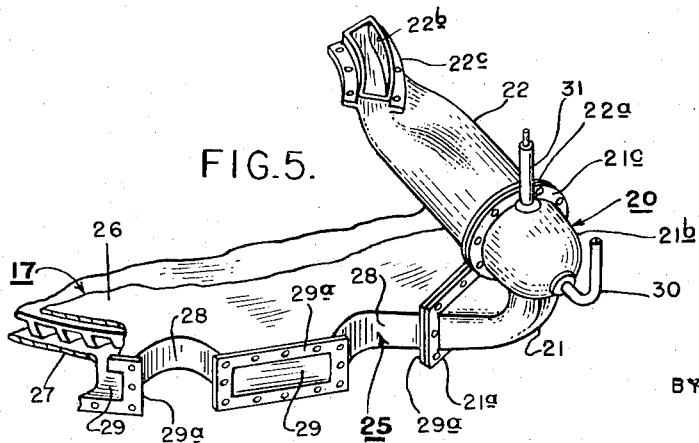
Fig. 5 is a fragmentary perspective view of one of the gas turbine engine combustion chambers and associated casing structure.

The combustion chambers 20, as shown in Figs. 3, 4 and 5 are of the cannister type and are disposed in uniformly spaced tangential relation with the periphery of the turbine rotor 19. Since the combustion chambers may be identical, only one will be described. The combustion chamber is provided with a forward inlet duct portion 21 having a flange 21a disposed at the flared inlet end, and having an outer enlarged dome portion 21b of substantially hemi-spherical shape, provided with a circular flange 21c disposed at its downstream end. The combustion chamber is further provided with an outer shell 22 of generally cylindrical shape attached to the flange 21c by a circular flange 22a and having an outlet 22b of arcuate shape and mounting flanges 22c of similar shape.

A foraminous inner liner 23 of tubular shape is disposed within the outer shell 22 and dome portion 21b and is provided with an outlet 23a in registry with the arcuate outlet 22b.

Referring to Fig. 4 in particular, it will be noted that the combustion chamber outlets 22b are disposed in spaced circumferential alignment with each other to form an annular outlet for the combustion gases generated within the combustion chambers 20. The annular series of outlets 22b are disposed upsteam of the turbine rotor 19 (Fig. 3) and are bolted or otherwise attached to a circular disc 24 of saucer shape carrying a plurality of nozzle vanes 24a in an annular array at its periphery. The inlet ducts 21 of the combustion chambers are skewed somewhat with relation to the londitudinal axes of the outer combustion chamber shells 22 and are bolted or otherwise attached at their flanges 21a to a housing structure 25 enclosing the compressor impeller 17. The compressor housing structure 25 is provided with an upper wall 26 and a lower wall 27 spaced axially therefrom and a series of U-shaped side walls 28 disposed in spaced relation to each other and cooperating with the upper wall 26 and the lower wall 27 to define a plurality of air outlet passageways 29, each of which is encompassed by a peripheral flange 29a for attachment to the flanges 21a of the combustion chamber inlet ducts 21.

Fuel conduit means 30 is provided for each of the combustion chambers 20 for delivering liquid fuel thereto. Accordingly, suitable fuel nozzles 30a are provided for spraying the fuel into the liners 23. Also, suitable ignitor members 31 for initiating the combustion of fuel are provided.

The gas turbine engine 16 is provided with an outer shell 33 and the engine shaft 18 is supported therein by bearings 34 and 35 of any suitable type.

The lower wall 27 of the compressor housing 25 is provided with an upwardly flared central air inlet opening 36 (Fig. 3) disposed in registry with a conical member 37 supported at its lower end on the fuselage 11a and provided with a series of large elongated apertures 37a. The cowl 15 is further provided with an annular series of inwardly faired openings 38 communicating with the outside atmosphere, and an upper central opening 39 through which the engine shell 33 protrudes into registry with the periphery of the rotor hub 13.

Within the engine shell 33 and in coaxial alignment with the engine shaft 18, there is provided a power take-off shaft 40. A free-wheeling turbine rotor 41 having a plurality of blades 41a disposed in annular array thereupon is attached to the lower end of the power take-off shaft 40. Also, central core structure 42 of generally frusto-conical shape is provided within the hub 13, defining with the shell 33 an annular passageway 42a communicating with the hub chamber 13a and imparting an annular shape thereto. The core structure 42 is provided with an upper bearing portion 43 which cooperates with a sleeve member 44 attached to the hub 13 by means of a web 45. The sleeve 44 is supported upon the upper end of the power take-off shaft 40 in such a manner that the helicopter rotor 10 is supported by the shaft 40 which, in turn, is supported in the engine shell 33 by means of a plurality of radial struts 46 disposed in the passageway 42a and attached to the core member 42 and the shell 33.

Within the chamber 42b partially defined by the core member 42, there is provided a somewhat conventional speed reduction planetary gearing arrangement generally designated 47 having a driving pinion 48 carried by the power take-off shaft 40 and cooperating with a set of reduction gears 49a, 49b coaxially mounted and jointly rotatable. The gears 49a are in meshing relation with driving pinion 48, while gears 49b are disposed in meshing relation with a ring gear 50 provided on the internal wall of the sleeve member 44. Suitable bearing means 51 is provided between the sleeve member 44 and the core member 42 to permit rotation of the helicopter rotor 10 relative to the core member 42 and, accordingly, relative to the turbine engine 16.

The above-named structure, namely, the helicopter rotor 10, the speed reducing gearing 47, the free-wheeling turbine rotor 41 and the gas turbine engine 16 are supported upon the fuselage 11a by a plurality of angularly spaced vertical columns 53 having pads 53a at their upper ends attached to brackets 54 provided in the periphery of the shell 33.

In operation, air is drawn in through the cowl openings 38 and thence through the apertures 37a in the conical member 37 into the compressor impeller 17, wherein it is pressurized and delivered through the compressor casing outlets 29 to the inlet ducts 21 of the combustion chambers 20 and into the liners 23, wherein it is combined with fuel being sprayed thereinto by the fuel nozzles 30a and ignited by the ignitor members 31 to provide hot motive gases which flow through the combustion chamber outlets 22b and are delivered through the nozzle vanes 24a and past the turbine rotor 19 to drive the same, whereby the rotor shaft 18 is rotated, thus rotating the compressor impeller 17 to propagate operation of the gas turbine engine 16.

As the gases are exhausted from the turbine rotor 19 they are directed past a secondary row of turbine nozzle vanes 55 and the blades 41a of the free-wheeling turbine rotor 41 to rotate the latter. The thus partially expanded gases are then directed through the annular passageway 42a and into the chamber 13a of the hub, wherein they are divided into three streams as they flow through the outlets 13b in the hub. Each of the streams then flows through its associated blade duct 12a and exhaust nozzle 14 to the atmosphere, issuing in a jet to provide a propulsive thrust to the helicopter rotor 10.

As the free-wheeling turbine rotor 41 rotates, it, in turn, drives the power take-off shaft 40 and the driving pinion 48 mounted thereupon. The pinion 48, in turn, rotates the pinions 49a and 49b which drive the ring gear 50, thereby rotating the sleeve member 44 and the helicopter rotor 10 mechanically.

With the above arrangement, the helicopter rotor 10 is driven entirely by the utilization of the energy in the hot gases generated by the gas turbine engine 16. However, it will be noted that there is no mechanical linkage connection between the engine shaft 18 and the power shaft 40 of the free-wheeling turbine rotor, so that each of the turbine rotors, namely, the turbine rotor 19 and the free-wheeling turbine rotor 41 may operate independently at different speeds without deleteriously affecting the operation of either the helicopter rotor 10 or the engine 16.

Also, with this arrangement the gases generated by the gas turbine engine 16 are utilized to mechanically drive the helicopter rotor 10 by means of the free-wheeling turbine rotor 41 and then the remaining energy in the gases is directed through the exhaust nozzles 14 in a jet to provide an augmenting thrust to the helicopter rotor. Thus, it will be seen that with the invention above described, a highly efficient propulsion apparatus for a helicopter rotor is provided.

Also, since the propulsion apparatus is coaxially mounted in axial alignment with the rotational axis of the helicopter rotor, a symmetrical and balanced arrangement is provided which lends itself to ease of installation upon the fuselage 11a and simple yet reliable support structure therefor.

Since the air inlets 38 in the cowl are disposed in an anular array about the periphery of the cowl, the air from the atmosphere is readily admitted to the inlet of the engine 16 without undue pressure drop losses.

It will also be noted that, with the above described invention, the propulsion apparatus is relatively short in axial length relative to its diameter, which further lends itself to sturdy and reliable construction.

Although the invention has been described in connection with a gas turbine engine 16 for providing the motive gases for driving the helicopter rotor, it must be understood that the invention is not so limited and that other arrangements for providing motive gas for the free-wheeling turbine rotor 41 and the exhaust nozzles 14 may be provided and are within the scope of the invention. However, the described arrangement is highly desirable from an economic viewpoint as well as from a manufacturing and service viewpoint.

While the invention has been shown in but one form, it will be obvious to those skilled in the art that it is not so limited, but is susceptible of various changes and modifications without departing from the spirit thereof.

What is claimed is:

1. In a helicopter comprising an aerodynamic rotor having a central hub portion and a plurality of blades attached to said hub and rotatable about a substantially vertical axis; a gas turbine power plant disposed beneath said hub and having its longitudinal central axis in alignment with the axis of rotation of said aerodynamic rotor, said power plant including an air compressor, a primary axial flow turbine rotor connected in driving relation to said compressor and fuel combustion apparatus interposed between said compressor and said primary turbine rotor, said primary turbine rotor being ineffective to drive said aerodynamic rotor; a free-wheeling secondary axial flow turbine rotor disposed in the exhaust gas passageway of said primary turbine rotor; and speed reduction means interconnecting said free-wheeling turbine rotor and said aerodynamic rotor, whereby said aerodynamic rotor is driven by said free-wheeling turbine rotor independently of said primary turbine rotor.

2. In a helicopter having an aerodynamic rotor provided with a central hub portion and a plurality of blades attached to said hub and rotatable about a substantially vertical axis: means defining a gas passageway extending through said hub; means comprising a hot gas generator having an exhaust outlet in registry with said hub passageway; each of said blades having an exhaust nozzle and a longitudinal passageway communicating with said hub passageway and terminating at said exhaust nozzle, whereby said aerodynamic rotor is jet propelled by hot gas from said gas generator; and means for augmenting the propulsion of said aerodynamic rotor including a free-wheeling turbine rotor interposed in said exhaust outlet, said propulsion augmenting means further including speed reduction means interconnecting said free-wheeling turbine rotor and said aerodynamic rotor.

3. In a helicopter comprising an aerodynamic rotor having a central hub portion and a plurality of blades attached to said hub and rotatable about a substantially vertical axis, each of said blades having an exhaust nozzle and a longitudinal motive fluid passage extending from said hub to said exhaust nozzle for jet propelling said aerodynamic rotor: a gas turbine power plant disposed beneath said hub and having its longitudinal central axis in alignment with the axis of rotation of said aerodynamic rotor, said power plant including an air compressor, a primary axial-flow turbine rotor connected in driving relation to said compressor and fuel combustion apparatus interposed between said compressor and said primary turbine rotor; a free-wheeling secondary axial-flow turbine rotor disposed downstream of said primary turbine rotor; and speed reduction means interconnecting said free-wheeling turbine rotor and said aerodynamic rotor, whereby said aerodynamic rotor is driven by said free-wheeling turbine rotor independently of said primary turbine rotor; said central hub having an annular passage connecting the exhaust outlet of said free-wheeling turbine rotor to said blade passages; whereby the exhaust motive gases from the power plant are exhausted to atmosphere through said exhaust nozzle.

4. In a helicopter comprising an aerodynamic rotor having a central hub portion and a plurality of blades attached to said hub and rotatable therewith about a substantially verical axis, each of said blades having an exahust nozzle disposed adjacent its outer tip and a longitudinal motive gas passage connecting said exhaust nozzle and said hub: propulsion means for driving said rotor including a gas turbine engine having an air inlet and an annular exhaust gas outlet, a free-wheeling turbine rotor disposed in said annular gas outlet, means connecting said free-wheeling turbine in driving relation with said hub, said connecting means including speed reduction gearing; and a central chamber confining said speed reduction gearing; said annular gas outlet communicating with each said blade passage, whereby the exhaust motive gas is directed through each said exhaust nozzle in a jet to augment propulsion of said aerodynamic rotors, said gas turbine engine, said free-wheeling turbine rotor and said chamber being disposed in vertical axial alignment with each other and with said aerodynamic rotor.

5. In a helicopter having an aerodynamic rotor provided with a central hub portion and a plurality of blades attached to said hub and rotatable about a substantially vertical axis: means defining a gas passageway extending through said hub; means comprising a hot gas generator having an exhaust outlet in registry with said hub passageway; each of said blades having an exhaust nozzle and a longitudinal passageway communicating with said hub passageway and terminating at said exhaust nozzle, whereby said aerodynamic rotor is jet propelled by hot gas from said gas generator; and means for augmenting the propulsion of said aerodynamic rotor including a free-wheeling turbine rotor interposed in said exhaust outlet, said propulsion augmenting means further including speed reduction means interconnecting said free-wheeling turbine rotor and said aerodynamic rotor, said hot gas generator comprising a gas turbine engine having an air compressor, a turbine rotor for driving said compressor, and a plurality of fuel combustion chambers interposed between said compressor and said driving turbine rotor, said combustion chambers being of the cannister type and being disposed in angularly spaced tangential relation to said driving turbine rotor, and said gas turbine engine being disposed beneath said hub and having its central axis in alignment with the axis of rotation of said aerodynamic rotor.

6. In a helicopter comprising an aerodynamic rotor having a central hub portion and a plurality of blades attached to said hub and rotatable about a substantially vertical axis, each of said blades having an exhaust nozzle and a longitudinal motive fluid passage extending from said hub to said exhaust nozzle for jet propelling said aerodynamic rotor: a gas turbine power plant disposed beneath said hub and having its longitudinal central axis in alignment with the axis of rotation of said aerodynamic rotor, said power plant including an air compressor, a primary axial-flow turbine rotor connected in driving relation to said compressor and fuel combustion apparatus interposed between said compressor and said primary turbine rotor; a free-wheeling secondary axial-flow turbine rotor disposed downstream of said primary turbine rotor; speed reduction means interconnecting said free-wheeling turbine rotor and said aerodynamic rotor, whereby said aerodynamic rotor is driven by said free-wheeling turbine rotor independently of said primary turbine rotor; said central hub having an annular passage connecting the exhaust outlet of said free-wheeling turbine rotor to said blade passages; whereby the exhaust motive gases from the power plant are exhausted to atmosphere through said exhaust nozzle; and a hollow core member disposed in said hub and in axial alignment therewith, said core cooperating with said hub to define said annular gas passage, said core further defining a central chamber enclosing said speed reduction means, whereby the speed reduction means are shielded from the motive gases.

References Cited in the file of this patent

UNITED STATES PATENTS

| | | |
|---|---|---|
| 1,982,969 | Stalker | Dec. 4, 1934 |
| 2,469,480 | Sikorsky | May 10, 1949 |
| 2,500,002 | Miller | May 7, 1950 |
| 2,609,662 | Vogt | Sept. 9, 1952 |
| 2,741,320 | Rhule | Apr. 10, 1956 |